J. P. LINDSAY.
Clasps for Stocking-Supporters.

No. 156,429. Patented Nov. 3, 1874.

Witnesses.
S. W. Piper.
L. W. Mellen.

John P. Lindsay
by his attorney
R. H. Eddy

UNITED STATES PATENT OFFICE.

JOHN P. LINDSAY, OF BOSTON, MASSACHUSETTS.

IMPROVEMENT IN CLASPS FOR STOCKING-SUPPORTERS.

Specification forming part of Letters Patent No. 156,429, dated November 3, 1874; application filed August 31, 1874.

*To all whom it may concern:*

Be it known that I, JOHN P. LINDSAY, of Boston, of the county of Suffolk and State of Massachusetts, have invented a new and useful or Improved Clasp for Stocking-Supporters or Various other Articles of Wearing Apparel; and I do hereby declare the same to be fully described in the following specification and represented in the accompanying drawings, of which—

Figure 1:
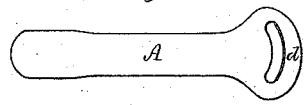
Figure 5:
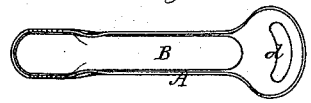
Figure 2:
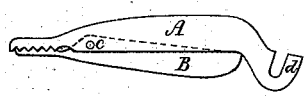
Figure 6:
Figure 3:
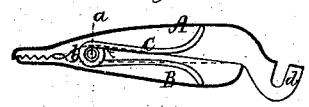
Figure 7:
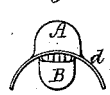
Figure 4:
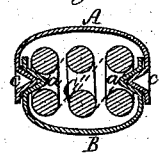

Figure 1 is a top view, Fig. 2 a side elevation, and Fig. 3 a longitudinal section, of a clasp containing my invention. Fig. 4 is a transverse section, on an enlarged scale, taken through its pivots. Fig. 5 is an under-side view of it. Fig. 6 is a transverse section taken through the tails of the jawed levers. Fig. 7 is a rear-end view of the clasp.

Figure 8:
Figure 9:
Figure 10:
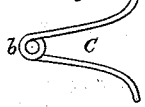

It is composed of two jawed levers, A B, pivoted together, and a spring, C, arranged between them. In constructing the clasp I make the tail of each jaw-lever concavo-convex in transverse section, as shown in Fig. 6, the lower lever with its jaw being extended within the upper lever, and its jaw in manner as represented. At the place of connection of the two levers, the lower one is to be punched inward on its flanks, so as to form two concavo-convex teats or projections, $a\,a$, arranged as shown in Fig. 4, and also in Fig. 8, which is a top view of the inferior lever. The spring C, shaped or made of wire, as shown in top view in Fig. 9, and in side elevation in Fig. 10, is to be slipped at its eye $b$ upon the two teats $a\,a$, after which the upper jaw-lever is to be arranged with respect to the spring and the lower one in manner as shown in Figs. 1, 2, 3, and 4, and next is to be punched inward on its flanks, as shown at $c\,c$, so as to enter the teats $a\,a$, and with them serve not only to connect the two levers, but pivot them together.

From the above it will be seen that the teats $a\,a$ not only operate to hold the spring in place, but with the teats $c\,c$ to connect the jawed levers together and constitute a fulcrum for them. It will also be seen that in consequence of the tails of the levers being made concavo-convex, and one arranged within the other, as shown, they thoroughly cover and protect the spring, and operate to prevent it from being caught in the stocking or clothing, or of moving laterally and getting out of place.

Each of the jaws made concavo-convex may be notched or provided with teeth in its opposite edges.

By having the jaw of the inferior lever close into the concavity of the jaw of the superior lever, a much better hold of the material or stocking will be secured than with concavo-convex jaws to abut together at their edges.

The tail of the superior jawed lever A I provide with a slotted head, $d$, formed as shown, it being projected from the tail of the jaw in manner as represented, in order that its flanks, in case of the clasp being pressed against the leg of the wearer, may bring up against it in a manner to prevent the tail of the inferior jawed lever from being accidentally moved inward, so as to open the jaws sufficiently to cause them to let go their hold on the stocking. The slotted head is also to enable the clasp to be attached to a strap of a stocking-supporter.

What I claim as my invention is as follows— that is to say:

The clasp composed of the levers provided with the operative spring, pivoted together by means of the indentations, as described, and made with concavo-convex jaws and tails, and with the one jaw to close within the concavity of the other, all substantially as specified.

JOHN P. LINDSAY.

Witnesses:
 R. H. EDDY,
 S. N. PIPER.